United States Patent [19]

Planke

[11] 3,960,261

[45] June 1, 1976

[54] APPARATUS FOR CONVEYING ARTICLES

[76] Inventor: Tore Planke, 3180 Nykirke, Norway

[22] Filed: Aug. 12, 1974

[21] Appl. No.: 496,613

[30] Foreign Application Priority Data
Aug. 14, 1973  Norway................................ 3232/73

[52] U.S. Cl.................................... 198/26; 198/50;
193/32
[51] Int. Cl.²......................................... B65G 47/00
[58] Field of Search ................ 198/20, 25, 26, 127,
198/62, 63, 50, 209; 193/32, 40, 35 A

[56] References Cited
UNITED STATES PATENTS

| | | | |
|---|---|---|---|
| 2,338,148 | 1/1944 | Walker .................... | 198/26 |
| 2,813,615 | 11/1957 | Klein....................... | 198/25 |
| 3,197,013 | 7/1965 | Van der Winden .................. | 198/20 |
| 3,670,904 | 6/1972 | Olivotto................................ | 193/32 |
| 3,693,777 | 9/1972 | Beauchemin .......................... | 198/26 |
| 3,830,355 | 8/1974 | Verjux ........................... | 198/127 R |

FOREIGN PATENTS OR APPLICATIONS

| | | | |
|---|---|---|---|
| 562,566 | 9/1958 | Canada................................ | 198/26 |
| 1,233,097 | 4/1959 | France................................. | 193/32 |
| 153,204 | 1/1956 | Sweden................................ | 198/25 |

*Primary Examiner*—Albert J. Makay
*Assistant Examiner*—James M. Slattery
*Attorney, Agent, or Firm*—Nolte and Nolte

[57] ABSTRACT

Apparatus for conveying articles of different physical characteristics, particularly bottles of different sizes and weights which comprises a generally upright tubular guide through which the articles pass and, towards a lower delivery end of the guide tube, a rotating roller projects into the tube to contact the articles and slow them down before the articles are delivered to article receiving members from which they are ejected to be transported to a receiving station.

5 Claims, 3 Drawing Figures

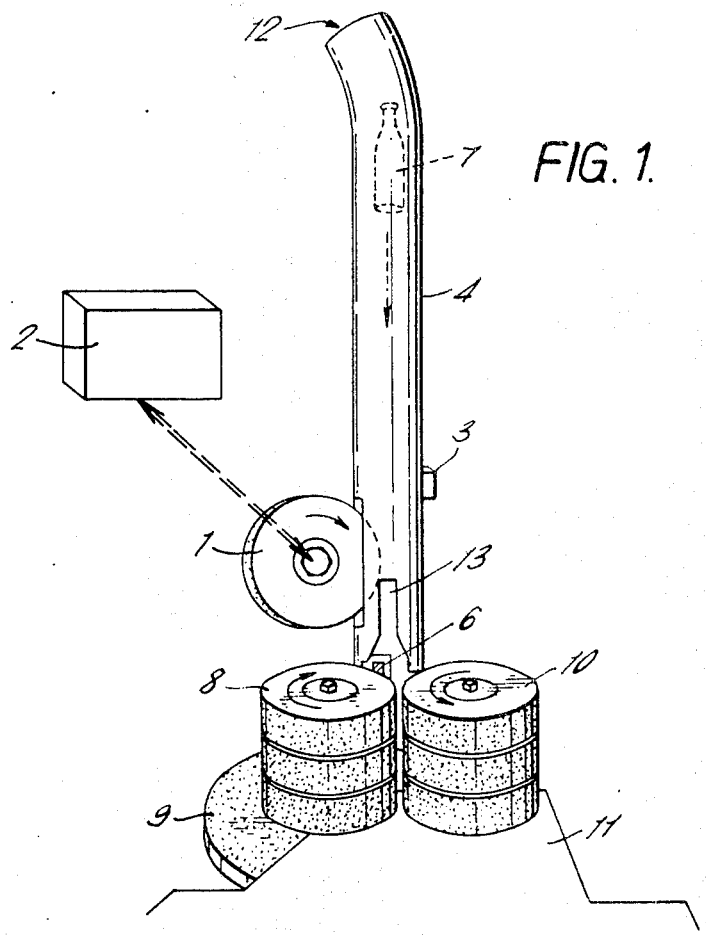

APPARATUS FOR CONVEYING ARTICLES

The present invention relates to a method for transporting articles, preferably bottles of various sizes, shapes and weight and for removing the same, as well as a device for carrying out said method.

In particular in connection with automatic transport of bottles in a vertical direction it has been a problem to make the known devices function satisfactorily. Among such devices paternosters for continuous transport of units of goods should be mentioned. Devices of this kind are inter alia arranged in many groceries for transporting empties from the shop down to the basement or a lower floor where the bottles are collected. In such devices the bottles are placed in a rotary means, so that one bottle at a time is fed into the floors of the paternoster during the step-wise rotation of the rotary means. Basically the paternoster functions like an elevator and in this case each bottle is lowered with constant speed. Due to the large number of moving parts of the paternoster the mechanical system is very often subjected to contamination from the empties and thus requires regular and often very complicated maintenance. When the distance between the input station and the output station is large, such a device will become very expensive in purchase as well as in operation. Also, the transporting speed is very limited.

With the present invention said disadvantages are overcome and a solution inexpensive in purchase as well as in operation is provided, where the requirements of maintenance are minimal and the reliability of operation is great. The invention is in particular provided for use in connection with the apparatus described in the Norwegian Pat. Specification No. 126,900 owned by the inventor of the present invention. The present invention may, however, also be used in factory plants in connection with the transport of e.g. bottles, cans and the like, e.g. from the manufacturing division to the packing division of the factory. But the invention is in particular meant for use in connection with the registration apparatus for empty bottles as described in said Specification, the device according to the present invention then being connected to the output section of said apparatus or automat.

According to the invention the bottle is by means of gravity made to fall substantially freely in a suitable guide means, a tube or the like, it is braked by at least one speed regulator unit, preferably comprising rotating roller, e.g. of a porous, resilient material having a high surface friction coefficient, acting against the bottle, whereafter the bottle is allowed to fall substantially freely for a last portion onto a rotating disk or a conveyor belt provided with an impact absorbing coating, whereupon the bottles can be guided to an ejecting means, preferably consisting of a pair of rotating rollers provided with a resilient material having a high surface friction coefficient.

Further features of the invention will appear from the subsequent claims and from the description below with reference to the drawing, where FIG. 1 is a diagrammatical front view of the device according to the invention, FIG. 2 shows a top view of the device according to FIG. 1, and FIG. 3 shows a top view of a modification of the device.

In FIG. 1 a tube 4 is shown serving as a conveyor means for the goods to be transported. The non-limiting example of the utilization of the invention illustrates how goods, e.g., bottles as shown, are transported by means of gravity from the opening 12 down towards a speed regulator unit 1,2. The bottle will hit the wheel or roller 1, which is preferably provided with a frictional surface and for the rest consists of a resilient material. The wheel 1 is rotatable and directly connected with a speed regulator 2, which e.g., can be a motor driven at substantially constant speed or a so-called governor. When the bottle has passed the speed regulator unit its substantially free fall will be braked so that its further falling speed is substantially determined by the speed of the wheel 1. At the end of the last fall of the bottle its bottom will hit a rotating shock absorbing plate 9 or a shock absorbing conveyor belt 5, whereupon the bottle is urged from the opening 13 towards the ejection means 8,10 by the aid of said rotating plate or conveyor belt and possibly a pushing means 6. Said ejection means may consist of two groups of rollers rotating about a vertical axis and consisting of a resilient material, the surfaces of said rollers having a high frictional coefficient. The rotation of the rollers is preferably synchronized with that of said plate 9 or with the movement of the conveyor belt. The means 6 is a quick-action pushing means ensuring the bottles against tilting backwards because of the rotating plate 9 or the conveyor belt 5. The bottle 7 then passes between the ejector rollers 8,10, e.g., as illustrated in FIGS. 2 and 3, and is urged out onto a collecting station 11 in the shape of a large table or e.g., a conveyor belt for further transport in a horizontal direction. Suitably arranged gates or the like near the ejector device prevent the goods from being carried back, e.g., onto the plate 9. For the sake of clarity said gates are not shown in the drawing.

To ensure a reliable and suitable feeding into the device according to the invention a detector means 3 may be arranged near the wheel 1, which detector means may e.g., be optical or consist of a sensor means connected to a micro switch. At the lower end of the tube a photo electric cell may advantageously be arranged so as to detect a bottle that may be broken, e.g., due to a defect in the glass, or any danger of piling. Based on precalculated safe time margins the detectors can thus cooperate with a suitable feeding apparatus. The device may be mounted on a frame to be easily installed as a ready unit.

The rotation and the frictional ability of the wheel 1 can easily be adapted to the total length of the tube and the expected range of weight of the bottles to be braked. If the height of fall is particularly large and the bottles are heavy it might be suitable to provide two or more speed regulator units at even intervals along the tube 4. The invention may also be used on a time-sharing basis e.g., if it is desirable to use several feeding openings which all end in one and the same tube 4. This may e.g., be desirable in large super markets or in factories with several feeding stations on one floor or feeding from different floors of a building.

Within the scope of the invention it is naturally possible to modify the device so that it functions satisfactorily and reliably. The separate parts of the system can of course be adapted so that e.g., square articles or articles of any special shape may be conveyed. The field of utilization is naturally not limited to transport and removal of bottles, but can e.g. comprise cans, wrapped food and other articles suitable for such conveyance.

I claim:

1. Apparatus for conveying articles of different physical characteristics comprising, in combination, tubular guide means for guiding said articles along a path, speed retarding means disposed to act upon articles passing through said tubular guide means for reducing the speed of said articles, article receiving means, shock absorbing means associated with said said article receiving means for absorbing shock from articles delivered to said article receiving means, and ejector means for receiving articles from said shock absorbing means and feeding said articles to an article receiving station, wherein said speed retarding means comprises a rotating roller formed of a porous resilient material and having a surface with a high friction coefficient, said roller projecting into said tubular guide means, and speed regulating means connected to said rotating roller, and wherein said article receiving means includes a conveyor belt, said ejector means comprising a pair of coacting rotating rollers, said rollers being formed with a resilient surface having a high coefficient of friction and wherein said rollers of said ejector means are disposed for rotation about vertical axes and wherein said article receiving means includes a horizontally disposed rotating disc.

2. Apparatus for conveying articles of different physical characteristics comprising, in combination, tubular guide means for guiding said articles along a path, speed retarding means acting upon said articles passing through said tubular guide means for reducing the speed of said articles, article receiving means provided with a shock absorbing means for receiving said articles which pass from said speed retarding means and ejector means for receiving said articles from said shock absorbing means and feeding said articles to an article receiving station, wherein said speed retarding means includes a rotating roller formed of a porous resilient material having a surface with a high coefficient of friction and extending into said tubular guide means, speed regulating means connected to said rotating roller, said article receiving means including a horizontally disposed, rotating disc and wherein said ejector means includes a pair of coacting rollers, said rollers having a resilient surface of high frictional coefficient and said rollers being disposed for rotation about a vertical axis.

3. Apparatus as claimed in claim 2 wherein said tubular guide means are vertically disposed over a substantial partial part of said path of said article.

4. Apparatus for conveying articles of different physical characteristics comprising, in combination, tubular guide means for guiding said articles along a path, speed retarding means acting upon said articles passing through said tubular guide means for reducing the speed of said articles, article receiving means provided with a shock absorbing means for receiving said articles which issue from said speed retarding means through said tubular means and onto said article receiving means, pusher means for pushing said articles from an exit end of said tubular guide means and ejector means for receiving said articles pushed out by said pusher means and feeding said articles to an article receiving station, wherein said speed retarding means comprises a rotating roller formed of porous, resilient material and having a surface with a high coefficient of friction, said rotating roller projecting into said tubular guide means to contact articles passing through said guide means, speed regulator means associated with said rotating roller means, wherein said article receiving means includes a horizontally disposed, rotating disc and wherein said ejector means includes a pair of coacting rotating rollers, said rollers being formed of a resilient material having a surface with a high coefficient of friction and said rollers being mounted for rotation about a vertically disposed axis.

5. Apparatus as claimed in claim 4 wherein said tubular means are vertically disposed over a substantial part of the path of said articles.

* * * * *